Jan. 25, 1966   G. E. ZEIGLER   3,230,670
MOWER KNIFE SHARPENER
Filed June 5, 1963   4 Sheets-Sheet 1

INVENTOR.
GEORGE E. ZEIGLER
Victor J. Evans & Co.
ATTORNEYS

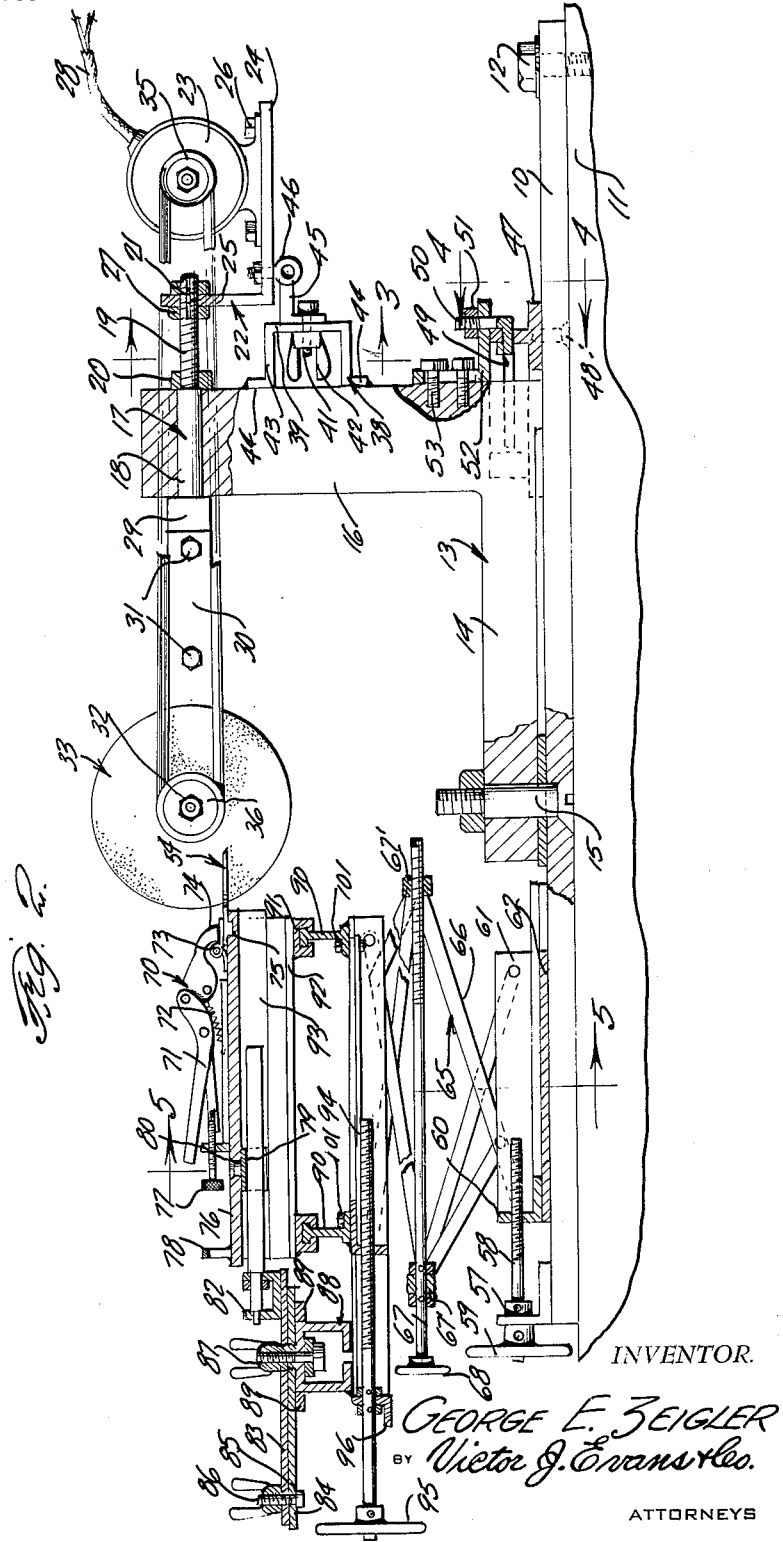

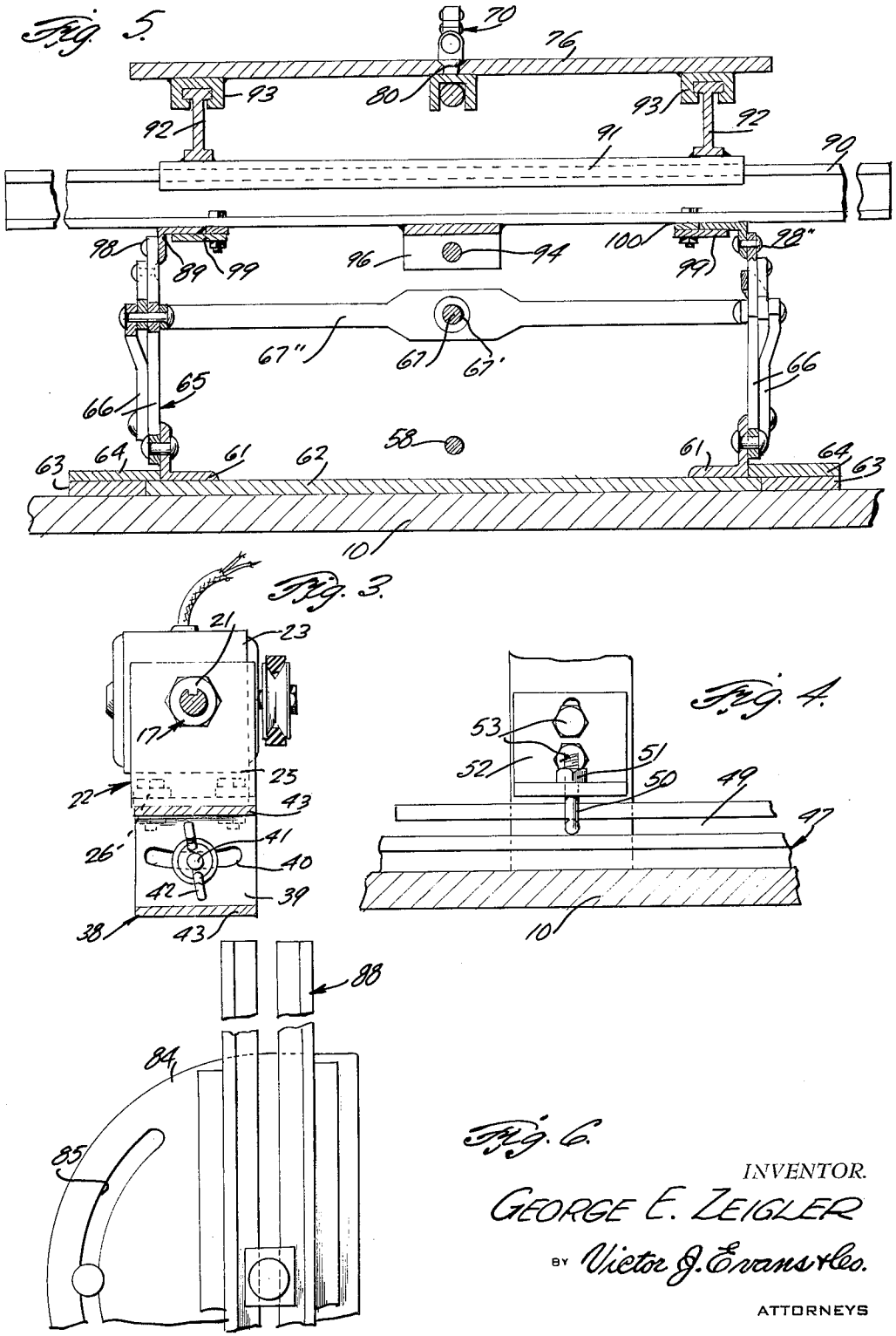

Jan. 25, 1966  G. E. ZEIGLER  3,230,670
MOWER KNIFE SHARPENER
Filed June 5, 1963  4 Sheets-Sheet 4
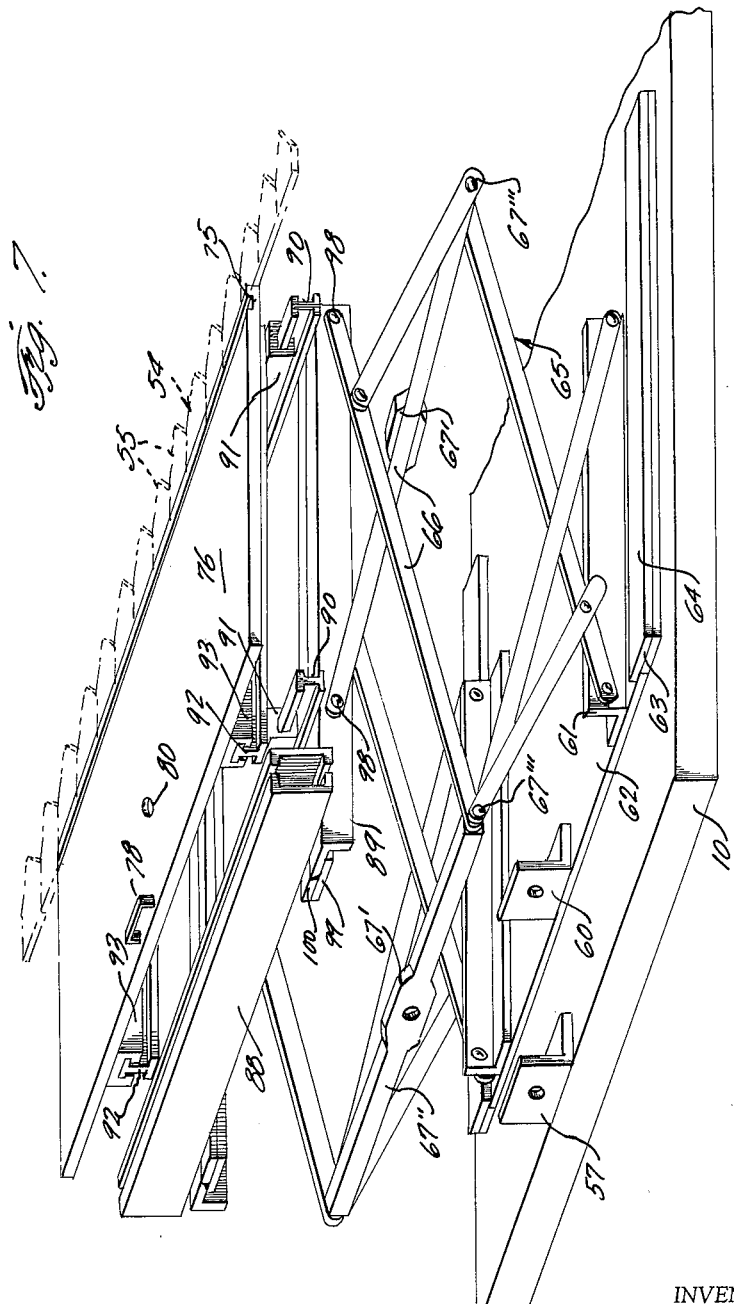
INVENTOR.
GEORGE E ZEIGLER
BY
Victor J. Evans &Co.
Attorneys

United States Patent Office 3,230,670
Patented Jan. 25, 1966

3,230,670
MOWER KNIFE SHARPENER
George E. Zeigler, 236 E. Church St., Urbana, Ohio
Filed June 5, 1963, Ser. No. 285,806
2 Claims. (Cl. 51—122)

This invention relates to a sharpening machine.

The object of the invention is to provide a sharpener which is adapted to be used for sharpening a knife such as the knife of a mower.

Another object of the invention is to provide a mower knife sharpener which includes a motor driven sharpening wheel that is adapted to be arranged in engagement with the teeth of the knife to be sharpened so that the cutting edges on the teeth can be sharpened with the desired high degree of accuracy and efficiency.

A still further object of the present invention is to provide a sharpening apparatus or machine wherein the desired or necessary adjustment thereof can be readily accomplished, and wherein the parts will be properly guided and maintained in their proper position for sharpening an element such as a mower knife.

Another object of the invention is to provide a mower knife sharpener which includes a means for adjustably supporting the motor driven sharpening wheel, and wherein the knife is also supported by an adjustable structure so that the knife and sharpening wheel can be brought into engagement with each other at the proper angular position in order to insure the most efficient sharpening of the knife.

A still further object of the invention is to provide a mower knife sharpener which includes or utilizes an abrasive wheel which has a concave face, and wherein the mower knife is held firmly in place to a transverse element of the face of the wheel while being sharpened, and wherein the knife and wheel are maintained in their proper aligned position so that the cutting portion of the individual sections of the knife as hollow ground and wherein high shoulders on the knife sections will be eliminated.

A still further object of the present invention is to provide a knife sharpener which includes means for manually adjusting the various parts thereof so that the sharpening wheel and knife can be brought into proper position relative to each other in order to insure that a knife or other member can be accurately and readily sharpened.

A further object of the invention is to provide a mower knife sharpener which is extremely simple and inexpensive to manufacture.

Other objects and advantages will be apparent during the course of the following description.

In the accompanying drawings, forming a part of this application, and in which like numerals are used to designate like parts throughout the same.

FIGURE 2 is a sectional view taken on the line 2—2 of FIGURE 1.

FIGURE 3 is a sectional view taken on the line 3—3 of FIGURE 2.

FIGURE 4 is a sectional view taken on the line 4—4 of FIGURE 2.

FIGURE 5 is a sectional view taken on the line 5—5 of FIGURE 2.

FIGURE 6 is a fragmentary plan view illustrating certain constructional details of the present invention.

FIGURE 7 is a perspective view illustrating certain constructional details of the present invention.

Figure 1:
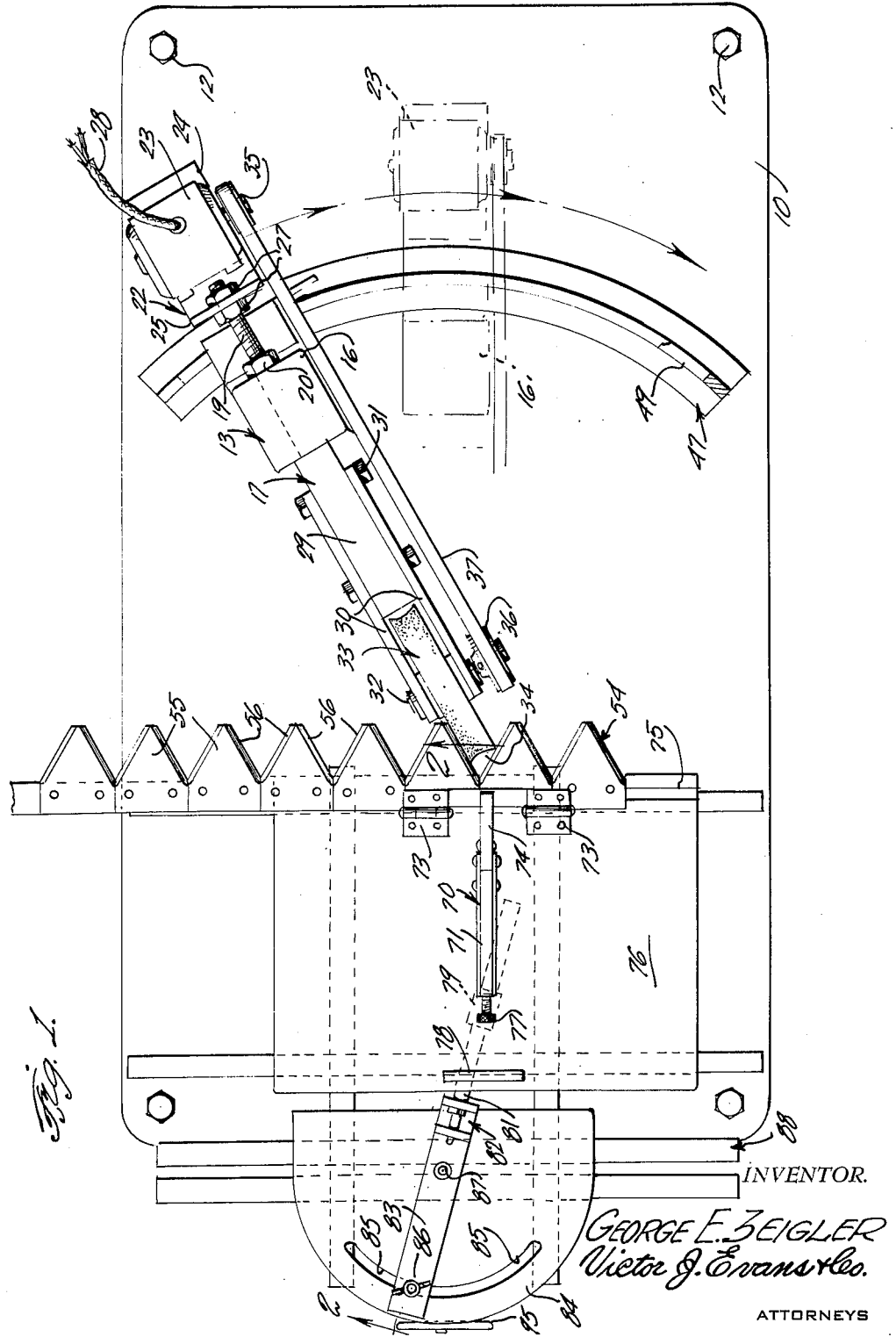
FIGURE 1 is a plan view of the mower knife sharpener of the present invention.

Referring in detail to the drawings, the sharpener of the present invention is shown to comprise a horizontally disposed base 10 which is adapted to be mounted on and fastened to a suitable supporting structure such as the table 11 by means of securing elements 12. The present invention is illustrated and described specifically for use in sharpening a mower knife, but it is to be understood that it can be used for sharpening other elements or equipment in addition to mower knives. The numeral 13 indicates an L-shaped support member which includes a horizontally disposed leg 14 that is pivotally connected to the base 10 by means of a pivot pin 15. The support member 13 further includes a vertically disposed leg 16. The numeral 17 indicates a rod which has a portion 18 extending through the upper end of the leg 16, and the rod 17 further includes a threaded portion 19 which has a nut 20 thereon. The rod 17 is provided with a keyway 21, and the numeral 22 indicates an L-shaped bracket which is connected to the portion 19 of the rod 17, and the bracket 22 is maintained on the rod by means of nuts 27. The bracket 22 includes a horizontal portion 24 as well as a vertical portion 25, and an electric motor 23 is connected to the horizontal portion 24 by means of securing elements 26. The motor 23 is adapted to be connected to a suitable source of electrical energy by means of wires 28.

As shown in FIGURE 1 for example, a pair of spaced parallel braces or bars 30 are fastened to the portion 29 of the pin 17 by means of securing elements 31, and the number and arrangement of such braces or bars can be varied as desired or required. An axle or shaft 32 extends through the outer ends of the braces 30, and a sharpening wheel 33 is mounted on the shaft 32. The sharpening wheel 33 is provided with a concave or recessed outer peripheral portion as indicated by the numeral 34. A pulley 35 is driven by the motor 23, and a similar pulley 36 is mounted on the shaft 32, there being an endless belt 37 trained over the pulleys 35 and 36.

The numeral 38 indicates a body member which is fastened to the vertical leg 16 of the support member 13, as for example by welding, and the body member 38 includes a vertical section 39 which is provided with a curved slot 40 therein, FIGURE 3. The body member 38 further includes horizontal sections 43 which terminate in flanges 44 that are secured as by welding to the leg 16. A securing element 41 extends through the slot 40 and has a wing nut 42 thereon. The numeral 45 indicates a clamp piece which engages the securing element 41, and the clamp piece 45 is connected to a clamp member 46 which is arranged in engagement with the lower portion 24 of the bracket 22.

There is further provided a curved track 47 which is fastened to the base 10 as at 48, and the track 47 is provided with an arcuate or curved slot 49. J-bolts 50 have portions thereof extending through the slot 49, and the bolts 50 are connected to an L-shaped member 52 by means of nuts 51, the member 52 being fastened to the vertical leg 16 of the support member 13 by means of securing elements 53.

In FIGURES 1 and 2 there is shown a portion of a conventional mower knife 54 which is being sharpened by the machine of the present invention, and it is to be understood that other elements in addition to mower knives can be sharpened on the present invention. The mower knife 54 includes a plurality of spaced apart triangular sections 55 which have cutting edges 56 thereon that are to be sharpened.

A means is provided for adjustably supporting the mower knife 54, and this means comprises a screw member 58 which extends through an L-shaped bracket 57, and the bracket 57 is secured as by welding to the base 10, FIGURE 7. A hand wheel 59 is arranged on an end of the screw member 58 for rotating the screw member 58, and the screw member 58 engages an L-shaped bracket 60 which is secured as by welding to a sliding plate 62. A pair of angle irons 61 are secured as by welding to the plate 62, and the plate 62 is mounted for sliding movement between a pair of guide rails 63. Strips or flanges 64 are secured above the rails 63 so as to help maintain the plate 62 in its proper aligned position as it moves back and forth due to the rotation of the screw member 58.

There is further provided an adjustable jack which is indicated generally by the numeral 65, and the jack 65 includes linkage 66, and there is provided a screw member 67 for adjusting the linkage 66 of the jack 65. A hand wheel 68 is arranged on an end of the screw member 67, and the screw member 67 extends through apertured portions 67' of cross pieces 67", and the cross pieces 67" are connected to the jacket as at 67'''.

The numeral 70 indicates a clamp which includes a jaw portion 74 as well as a movable lever 71 which is pivotally supported or mounted, and a spring 72 is provided for urging the clamp 70 into closing relation with respect to the mower knife 54. There is further provided hinge member 73 for helping to maintain the mower knife 54 stationary in its proper position, and the knife 54 is supported on an upper wall member 76, the wall member 76 being provided with an elongated slot 75. A screw member 77 is provided for adjusting the clamp 70.

As shown in FIGURE 2 for example, a handle 78 is connected to the wall member 76, and the numeral 79 indicates a clip which is fastened to the wall member 76 as at 80. A pin or rod 81 is arranged contiguous to the clip 79, and the pin 81 engages a channel member 82 which is arranged on a bar 83. The numeral 84 indicates a platform which is arranged below the bar 83, and the platform 84 is provided with a curved slot 85 through which extends a bolt or securing element 86, and there is further provided a pivot pin 87. The numeral 88 indicates a channel section which is connected to guide strips 89, as shown in the drawings.

There is further provided I-beams 90 which have their upper ends arranged in engagement with channel pieces 91, and the channel pieces 91 are secured as by welding to beams 92, and the beams 92 are slidable in track members 93, the track members 93 being secured as by welding to the plate 76. The numeral 94 indicates a screw member which extends through and engages members 96 and 97, and a manually operable handle 95 is arranged on an end of the screw member 94. The upper end of jack 65 is connected as at 98 to the members 89, and guide members 99 and 100 are arranged as shown in FIGURE 7.

From the foregoing, it is apparent that there has been provided a machine which is especially suitable for use in sharpening a mower knife such as the mower knife 54. The mower knife 54 is adapted to be clamped in place by means of the clamp 70 and the hinge member 73, and it will be seen that with the motor 23 connected to a suitable source of electrical energy through the medium of the wires 28, the pulley 35 can be rotated. As the pulley 35 is rotated, the belt 37 will be turned and this will cause rotation of the pulley 36. Since the pulley 36 is mounted on the shaft 32, it will be seen that the shaft 32 will rotate so as to cause rotation of the sharpening or grinding wheel 33. The sharpening wheel 33 is provided with the arcuate or concave periphery 34 which serves to insure that the edges such as the edges 56 of the knife 54 will be properly ground or sharpened. The pivot pin 15 permits the support member 13 to pivot about an axis extending through the pin 15 so that the wheel 33 can be positioned at the desired spot for grinding the various edges or surfaces of the knife 54. The J-bolts 50 help guide the rotating or shifting support member 13. The pin 17 provides a further pivotal mounting so that by loosening the wing nut 42 for example, the motor 23 as well as the wheel 33 can be sifted to different angular positions with respect to the knife.

Furthermore, the knife 54 which is being sharpened or ground can be moved to different positions as desired. For example by rotating the hand wheel 59, the entire jack 65 and its associated parts can be moved back and forth towards or away from the wheel 333. Similarly, by rotating the hand wheel 68, the linkage 66 will be pivoted up or down so that the effective height or elevation of the jack can be changed as desired. The screw member 77 can be used for shifting the position of the clamp 70 which helps hold the mower knife 54.

The parts can be made of any suitable material and in different shapes or sizes.

The screw member 94 can be rotated by means of the hand wheel 95, and the screw member 94 engages members 96 and 97 so that this rotation of the screw member 94 provides a further means of adjustment.

While the present invention has been described being used for sharpening a mower knife such as the mower knife 54, it is to be understood that other types of tools or implements can be conveniently or readily sharpened with the present invention. It is to be noted that with the present invention the super-structure is mounted on the jack 65 so that the mower knife 54 can be adjusted to the desired position. The wheel 33 may be an emery wheel, and suitable bearings as well as braces can be used wherever desired or required.

An important aspect or principle of the present invention is that by rotating the abrasive wheel 33 about a vertical axis, the face of the abrasive wheel can be brought into a position parallel to the edge of the adjacent mower knife section, as for example as shown in FIGURE 1. The abrasive wheel is adapted to be rotated about its horizontal axis until a transverse element of the face of the abrasive wheel is parallel to the cutting edges of the section to be sharpened and this requires an abrasive wheel with a concave face as indicated by the numeral 34 so that the transverse element is convex to hollow ground a uniformly concave edge on the blade.

The numeral 65 indicates a scissors jack which is adjustable both horizontally and vertically by means of hand wheels and instead of using such a scissors jack, a hydraulic jack or other means of horizontal and vertical adjustment which will be required for different makes of mower knife blades or for different diameter abrasive stones can be used. The I-beams 90 can move forward and backward as a unit under control of the upper hand wheel 95, so that the knife section can be brought into contact with the abrasive wheel 33, and the beams 90 are adapted to be secured to the members 100 in any suitable manner, as for example by means of securing elements or bolts 101.

The mower knife holding plate 76 can be adjusted to the desired position and as shown in FIGURE 1 for example, the motor 23 can be moved from the solid line position of FIGURE 1 to the broken line position since the support member 13 is pivoted on the pin 15 and this permits proper setting or adjustment of the abrasive wheel 33.

Some of the advantages of the present invention are as follows. Each mower knife section is sharpened throughout its entire length. The sharpened sections have the same level, and each sharpened section is hollow ground. The direction of each cutting edge of each section has the same direction with respect to the knife.

as a whole. The high shoulders on the knife sections are eliminated, and the bevels of the knife sections recommended by the manufacturer are maintained. The combined effect of the above advantages results in efficient cutting action and eliminates the major causes of knife breakage, i.e., high shoulders of sections, partially sharpened edges and improper direction of the cutting edges.

Thus, it will be seen that there has been provided a mower knife sharpener which will hold the mower knife firmly in place while being sharpened, and wherein the knife sections will be aligned in correct direction and position with respect to the abrasive wheel while being sharpened and also the abrasive wheel can be positioned in correct arrangement to sharpen the mower knife sections throughout their length with the correct bevel, as for example as recommended by the manufacturer. This gives correct alignment of the cutting edges of the sections with respect to the mower knife, and the cutting portion of the individual sections are hollow ground and high shoulders on the sections are eliminated.

It is to be noted that the member 88 functions as a base for direction or control, and the members 90 define rails for lateral movement. The member 88 and beams 90 are movable, parallel to the members 89 at the top of the jack 65.

The jack 65 is of the scissors type, and mounted above the jack 65 are the rails 90 which have the slidable members 91 thereon, and the members 90 are secured to the angle irons 89 as previously stated. The upper portion of the jack 65 is pivotally connected as at 98 to the angle irons 89.

The members 90 are arranged below the plate 76, and the parts are arranged so that the desired adjustment can take place. The rod 81 serves as a guide and controls the direction of motion of the member 76, and the direction of the rod 81 is fixed by the slot 85 and securing element 86. When the plate 76 is pushed forward it follows the course or direction of the rod 81 and this direction in effect is a vector, the horizontal components thereof being absorbed by the sliding members 90 and 91.

With further reference to the emery wheel 33, this wheel is provided with a concave face as indicated by the numeral 34, FIGURE 1. To place the wheel in grinding position, the member 14 is adapted to be rotated about its pivot 15 to a point or location where the side of the wheel 33 is parallel to the edge of the mower knife section, that is adjacent to the edge of the mower knife section to be sharpened. The member 14 and attached assembly are fastened in this position by clamping J-bolts 50. The emery wheel 33 and associated parts are next rotated until the edge of the mower knife section to be sharpened will make contact transversely across the concave face 34 of the wheel 33 when the plate 76 and attached mower knife are moved forward for providing a convex effect to cut a concave or hollow ground on the knife edge. The entire wheel 33 and assembly is adapted to be clamped in this position by clamping units such as those indicated by the numerals 41, 42, 43 and 45.

The emery wheel 33 is not as wide as the edge of the mower knife section is long, so that a diagonal motion must be imparted to the member 76, sweeping the knife section edge across the concave face 34. The direction of this motion is controlled by the rod 81 and adjustment for contact with the face (concave) 34 is provided by the member 95.

It is to be noted that when the edge of one mower knife section is sharpened, the member 76 is retracted and the assembly of which rod 81 is a portion, is released by loosening the clamp at 87, and the assembly is then moved the proper distance along the member 88 and again clamped in position by the clamp 87, and this shifting takes place due to the sliding action between the elements 90 and 91.

There is further provided a means for permitting adjustment to obtain the desired level on the mower knife section, and this comprises a height adjustment of the scissors jack 65, which can be accomplished by means of the screw 68 and as well as by the adjustment of the jack 65 by the member 59.

The screw member 77 functions as an adjusting screw for lengthening or shortening the clamp holding the mower knife blade 65 to the plate 76, and this adjustment is necessary since there is a difference in the thickness of the mower knife blades. The screw member 77 is adapted to be operated in a manner similar to adjustments that are made on a hand vice grip where it determines the distance the jaws of a hand vice grip are held apart. The spring 72 is in tension and holds the clamp 74 open, when in open position, when inserting, removing or adjusting the mower knife blade 55. The members 45 and 46 are part of a movable clamp to hold the wheel 33 in grinding position, and this clamp, hinged at 46, has flexibility to provide for wear and will make firm contact with the element 38 or 43 by tightening the wing nut 42.

Basically the principles or important aspects of the present invention are as follows. An element held parallel to the axle of a flat faced wheel is in contact with the face of the wheel across its width. It is to be noted that by turning the element through an angle about a radius of the wheel that the element will touch the face of the wheel at one point only, and with the element in this second position it will be in contact across the face of the wheel if a proper concave face is provided.

Minor changes in shape, size and rearrangement of details coming within the field of invention claimed may be resorted to in actual practice, if desired.

What is claimed is:

1. In a mower blade sharpener, a horizontally disposed base, a support member having a horizontally disposed leg pivotally mounted on a top portion of said base, a vertically disposed leg for said support member, an L-shaped bracket being mounted on an upper portion of said vertically disposed leg of said support member, a motor being mounted on said L-shaped bracket, a pair of braces secured to a top portion of said vertically disposed leg of said support member, said braces extending from the opposite side of said top portion from said motor, a sharpening wheel having a concave periphery and rotatably mounted on an end of said braces, an endless belt, said wheel being operatively connected to said motor by means of said endless belt, means for adjustably supporting a mower blade including an adjustable jack member, a plurality of sliding plates adapted to be actuated by screw members having corresponding handwheels, an adjustable clamp member for holding said mower blade, said sharpening wheel being an abrasive wheel having a concave periphery for engaging a straight portion of said blade edge throughout its length and for simultaneously forming a uniformly concave edge throughout.

2. In a mower blade sharpener, a base, a support member pivotally mounted on said base, a motor and a pair of braces mounted on a top portion of said support member, an abrasive wheel being mounted on an end of said braces and being rotatably connected to said motor by an endless belt, said mower blade sharpener including an adjustable supporting means for holding said mower blade, wherein said means comprises guide rails, a sliding plate and a screw member all being mounted on said base, an adjustable jack having cross-piece type linkage members, a screw member and a handwheel with said jack being mounted on said sliding plate, a pair of I-beams and a second set of sliding plates being mounted on an upper portion of said jack, an upper wall member, and an adjustable clamp being pivotally mounted on said wall member for maintaining the mower blade in the desired position.

References Cited by the Examiner
UNITED STATES PATENTS

| | | | |
|---|---|---|---|
| 507,634 | 10/1893 | Rodgers | 51—122 |
| 974,078 | 10/1910 | Knecht | 51—222 |
| 1,943,529 | 1/1934 | Hirth | 51—222 |
| 2,456,827 | 12/1948 | Greeley | 51—222 X |
| 2,490,244 | 12/1949 | Wahlstrom | 51—33 X |
| 2,715,797 | 8/1955 | Fuller | 51—222 X |
| 2,717,477 | 9/1955 | Moulton | 51—36 |
| 2,718,733 | 9/1955 | Stodick | 51—223 |
| 2,738,624 | 3/1956 | Osborn | 51—222 X |
| 2,748,539 | 6/1956 | Murray | 51—222 |
| 2,852,892 | 9/1958 | Fluckiger | 51—33 |
| 2,950,577 | 8/1960 | Shadle | 51—222 |

FOREIGN PATENTS

| | | |
|---|---|---|
| 162,998 | 4/1949 | Austria. |
| 602,972 | 1/1926 | France. |
| 640,733 | 4/1928 | France. |
| 1,155,916 | 12/1957 | France. |
| 46,289 | 7/1939 | Netherlands. |
| 326,856 | 2/1958 | Switzerland. |

HAROLD D. WHITEHEAD, *Primary Examiner.*

JOHN C. CHRISTIE, *Examiner.*

ROBERT C. RIORDON, L. J. SHECHTER, *Assistant Examiners.*